United States Patent [19]
Mogi et al.

[11] Patent Number: 5,970,952
[45] Date of Patent: Oct. 26, 1999

[54] COMBUSTION STATE DETECTOR APPARATUS FOR AN INTERNAL COMBUSTION ENGINE

[75] Inventors: Kazuhisa Mogi; Koichi Nakata, both of Susono; Toshiaki Yamaura; Eiji Takakuwa, both of Kariya; Yasuo Ito, Nagoya, all of Japan

[73] Assignee: Toyota Jidosha Kabushiki Kaisha, Aichi-ken, Japan

[21] Appl. No.: 09/095,341

[22] Filed: Jun. 10, 1998

[30] Foreign Application Priority Data

Jun. 25, 1997 [JP] Japan .................................... 9-168786

[51] Int. Cl.⁶ ...................................................... F02P 5/00
[52] U.S. Cl. ...................................... 123/406.27; 123/481
[58] Field of Search .......................... 123/406.26, 406.27, 123/481, 630

[56] References Cited

U.S. PATENT DOCUMENTS

| | | | |
|---|---|---|---|
| 5,005,547 | 4/1991 | Suga et al. | 123/406.26 |
| 5,087,882 | 2/1992 | Iwata | 123/406.26 |
| 5,775,298 | 7/1998 | Haller | 123/406.27 |

FOREIGN PATENT DOCUMENTS

| | | |
|---|---|---|
| 04-136485 | 5/1992 | Japan . |
| 04-148074 | 5/1992 | Japan . |
| 04-148076 | 5/1992 | Japan . |

*Primary Examiner*—John Kwon
*Attorney, Agent, or Firm*—Kenyon & Kenyon

[57] ABSTRACT

A combustion state detector apparatus for an internal combustion engine has a current detection device for detecting a current flowing between the ignition plug and a ground, and an ignition driving device for driving the ignition plug on the basis of an ignition instruction signal from an electronic control device of the internal combustion engine. An independent unit including a current detection device and an ignition driving device, is provided for each cylinder of the internal combustion engine. With respect to each cylinder, the apparatus determines whether a misfire has occurred on the basis of the current flowing between the ignition plug and the ground at the time of combustion. The apparatus is also capable of detecting abnormalities and/or wire breakages in a signal system provided for signal transmission between each independent unit and the electronic control device of the internal combustion engine.

7 Claims, 4 Drawing Sheets

COMBUSTION STATE DETECTOR APPARATUS FOR AN INTERNAL COMBUSTION ENGINE

INCORPORATION BY REFERENCE

The disclosure of Japanese Patent Application No. HEI 9-168786 filed on Jun. 25, 1997 including the specification, drawings and abstract is incorporated herein by reference in its entirety.

FIELD OF THE INVENTION

The present invention relates to a combustion state detector apparatus for an internal combustion engine that detects a combustion state in a combustion chamber of the internal combustion engine on the basis of a current that flows between the ground and an ignition plug disposed in the combustion chamber.

BACKGROUND OF THE INVENTION

Japanese Patent Application Laid-Open No. HEI 4-148074 and 4-148076 describes an ignition coil, an ion current detector unit and a switching element integrated into a single unit for all the cylinders of an internal combustion engine so as to achieve a compact construction and reduce the number of component parts required, thereby improving reliability. Japanese Patent Application Laid-Open No. 4-148076 describes a detecting device and a switching device integrated into a single unit for each cylinder of an internal combustion engine so as to achieve a compact construction and reduce the number of component parts required, thereby improving reliability.

In the detection of a misfire in an internal combustion engine, a typical diagnostic system outputs a misfire diagnostic signal and turns on a misfire diagnostic lamp. However, since the misfire diagnostic lamp can be turned on due to various factors, it is difficult to identify the cause of a misfire diagnosis even when the diagnostic lamp is tuned on. For example, when the misfire diagnostic lamp is turned on due to a connector contact failure, the cause is difficult to identify if the connector contact failure is one that has a low reproducibility. In the technology described in Japanese Patent Application Laid-Open No. HEI 4-148074, since various components are integrated into a single misfire detection unit for all the cylinders, it is difficult to determine which cylinder is experiencing the misfire. Therefore, the entire misfire detection unit for all the cylinders needs to be replaced. Moreover, this technology is unable to detect a wire breakage or a connector contact failure. The technology described in Japanese Patent Application Laid-Open No. HEI 4-148076 is able to check component parts separately for each cylinder when a misfire is detected, but is not able to detect a wire breakage or a connector contact failure.

SUMMARY OF THE INVENTION

Accordingly, it is an object of the present invention to provide a combustion state detector apparatus for an internal combustion engine capable of detecting a misfire in each cylinder of the internal combustion engine and of identifying a detection factor such as a wire breakage or a connector contact failure, in addition to a misfire.

According to the invention, there is provided a combustion state detector apparatus for an internal combustion engine, including the engine including a plurality of combustion chambers, comprises a central control unit, a plurality of independent satellite control units, and each of the satellite control units corresponds to a respective one of the combustion chambers and is coupled to the central control unit. Each satellite control unit includes an ignition plug disposed in the respective one of the combustion chambers, a current detection means for detecting a current flowing between the respective ignition plug and a ground and transmitting signals to the central control unit, and ignition driving means for driving the respective ignition plug. The central control unit detects a combustion state of the engine on the basis of the current detection signals received from the satellite control units and outputs ignition instruction signals to the ignition driving means of each of the satellite control units to control the driving of the ignition plugs. With this construction, the sending and the receiving of signals between the central control device and the current detection device can be performed separately for each cylinder of the internal combustion engine, so that it becomes easy to determine a misfire and other failure factors and identify a cylinder with the misfire or failure.

In the combustion state detector apparatus according to the invention, the current detection device may detect a voltage signal corresponding to an ion current occurring when the ignition plug is driven on the basis of the ignition instruction signal from the central control device. Furthermore, the current detection device may include a signal conversion device for converting the detected voltage signal corresponding to the ion current, into a current signal. Therefore, it becomes possible to input into the central control device a signal corresponding to an ion current occurring when the ignition plug is driven.

Furthermore, the combustion state detector apparatus according to the invention may further include a construction wherein the signal conversion device has an output offset device for causing an output from the signal conversion device to the central control device to be within a predetermined range, and wherein the central control device monitors an output signal from the signal conversion device and determines whether the output signal is within the predetermined range. Therefore, if the output signal is not within the predetermined range, the apparatus determines that a failure has occurred, for example, a breakage of a wire connected to the electronic control device, a connector contact failure or the like.

Further, the combustion state detector apparatus according to the invention may further include a construction wherein, with respect to each cylinder, if a first value of the output signal at a first time and a second value of the output signal at a second time after the first time from a respective one of the satellite control means are within second predetermined range, respectively and wherein, when the first and second values are both within the respective second range and a difference between a third value of the output signal at a third time after the second time and the second value is less than a predetermined amount, the central control means determines that a misfire has occurred when the first value and the second value are within a third predetermined range and, when the first and second values are both within the respective second range and the difference between the third value and the second value is less than the predetermined amount, the central control means determines that a malfunction other than a misfire has occurred when the first value and the second value are within a fourth predetermined range. Further, the central control device may output a diagnostic signal in accordance with a result of the determination made by the electronic control device. Therefore, it becomes possible to determine whether a misfire or a failure has occurred with respect to each cylinder. In addition, the record of misfires and failures can be stored in a diagnostic apparatus.

Further, in the combustion state detector apparatus according to the invention, the central control device may stop fuel supply to the cylinder that has the misfire or the unit failure, when the electronic control device determines that a misfire has occurred or that a unit failure has occurred. Therefore, it becomes possible to prevent, for example, an inflow of unburned gas to a catalytic device provided in an exhaust passage of the internal combustion engine, and therefore prevent overheating of the catalytic device, whereby the catalytic device can be protected and emission degradation can be prevented.

BRIEF DESCRIPTION OF THE DRAWINGS

The foregoing and further objects, features and advantages of the present invention will become apparent from the following description of a preferred embodiment with reference to the accompanying drawings, wherein like numerals are used to represent like elements and wherein.

DETAILED DESCRIPTION OF PREFERRED EMBODIMENT

Figure 1:
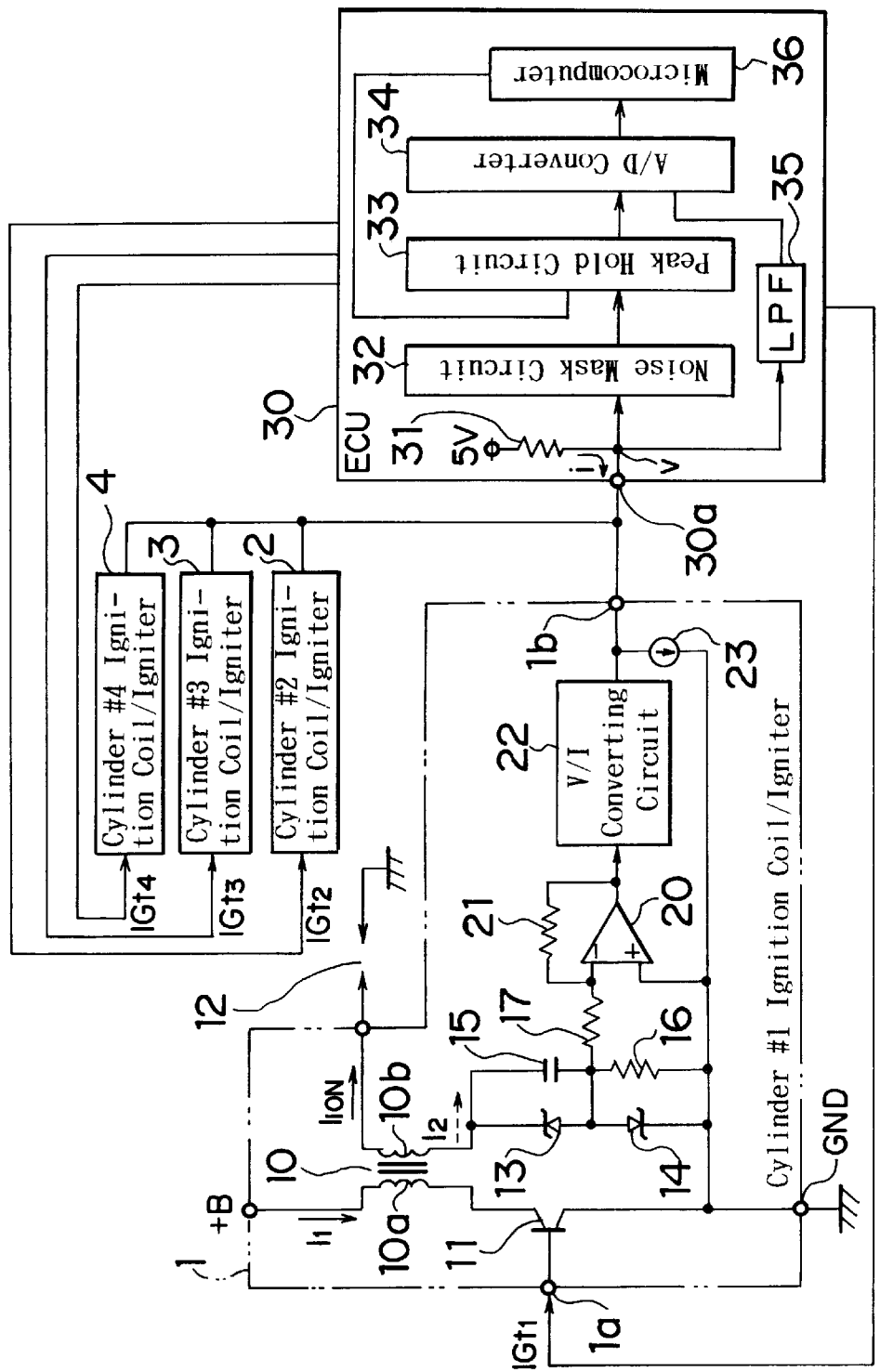
FIG. 1 is a schematic diagram of a preferred embodiment of the combustion state detector apparatus for an internal combustion engine of the invention.

A preferred embodiment of the present invention will be described in detail hereinafter with reference to the accompanying drawings. FIG. 1 is a block diagram illustrating the construction of a combustion state detector apparatus for an internal combustion engine according to an embodiment of the invention. According to this embodiment, an internal combustion engine has four cylinders #1–#4. The ignition coil/igniter units for the cylinders #1–#4 have the same construction. Therefore, the following description will be made mainly in conjunction with an ignition coil/igniter unit 1 for the cylinder #1.

Referring to FIG. 1, an ignition coil 10 has a primary winding 10a and a secondary winding 10b. An ignition plug 12 is disposed in a combustion chamber of the internal combustion engine (not shown). The primary winding 10a of the ignition coil 10 is connected to a switching element 11. When the gate of the switching element 11 receives an ignition instruction signal IGt1 from an electronic control unit (hereinafter, referred to simply as "ECU") 30 of the internal combustion engine, via an external connection terminal 1a, the switching element 11 turns on so that a primary current I1 from a terminal +B (external connection terminal) connected to a battery power source (not shown) flows through the primary winding 10a of the ignition coil 10. The ECU 30 is provided as an electronic control device according to this embodiment and will be described below.

A current passage on the secondary coil 10b side of the ignition coil 10 though which a secondary current I2 circulates is formed by the ignition plug 12, the secondary winding 10b of the ignition coil 10, a Zener diode 13 and another Zener diode 14. The Zener diode 14 is connected in a forward direction relative to the direction of the flow of the secondary current I2 (secondary circulating current). The Zener diode 13 is connected to charge a capacitor 15 connected as an ion current detecting power source in parallel to the Zener diode 13. A resistor 16 is connected in parallel to the Zener diode 14.

An ion current is detected as follows. An ion current IION flows from the capacitor 15 through the secondary winding 10b of the ignition coil 10 to the ignition plug 12. Further, the ion current IION flows from the inversion (−) terminal of an operational amplifier 20 through an ion current detecting resistor 17. The ion current IION is detected by the ion current detecting resistor 17. A resistor 21 connected between the inversion (−) terminal and an output terminal of the operational amplifier 20 is an amplifying resistor for setting a gain of the operational amplifier 20.

The voltage signal outputted from the operational amplifier 20 on the basis of the ion current IION is converted into a current signal by a V/I converting (voltage-to-current conversion) circuit 22. The output side of the V/I converting circuit 22 is connected to an external connection terminal 1b for connection to the ECU 30. The output side of the V/I converting circuit 22 is also connected to a negative offset current source 23 for causing an offset current I0 (described below) to constantly flow in order to detect a line or wire breakage. The other terminal of the offset current source 23 is connected to a GND terminal (external connection terminal) for grounding. Connected also to the GND terminal are the emitter of the switching element 11, the negative terminal of the Zener diode 14, one of the terminals of the resistor 16, and the non-inversion (+) terminal of the operational amplifier 20.

The external connection terminal 1b of the ignition coil/igniter unit 1 of the cylinder #1 is connected to an external connection terminal 30a of the ECU 30. The external connection terminal 30b is connected to a fixed power supply (5 V) by a pull-up resistor 31. Due to the fixed power supply (5 V) through the external connection terminal 30a, a current i flows through the external connection terminal 1b of the ignition coil/igniter unit 1 of the cylinder #1. The voltage signal v based on the current i is passed through a noise mask circuit 32, and then its peak value is held at set/reset timing by a peak hold circuit 33. The signal is then A/D-converted (analog-to-digital converted) by an A/D converter 34. The A/D-converted voltage signal is inputted to a microcomputer 36. The voltage signal v inputted to the ECU 30 is also processed by a low pass filter (LPF) 35 connected in parallel to the noise mask circuit 32 and the peak hold circuit 33, whereby high frequency components are removed from the voltage signal v. The filtered voltage signal v is converted by the A/D converter 34, and the converted signal is inputted to the microcomputer 36.

The microcomputer 36 is constructed as a logic operating circuit formed by a CPU (central processing unit) that executes various operations, a ROM storing various control programs, a RAM and a backup RAM for storing various data, input/output circuits, bus lines connecting therebetween, and the like.

Figure 2:
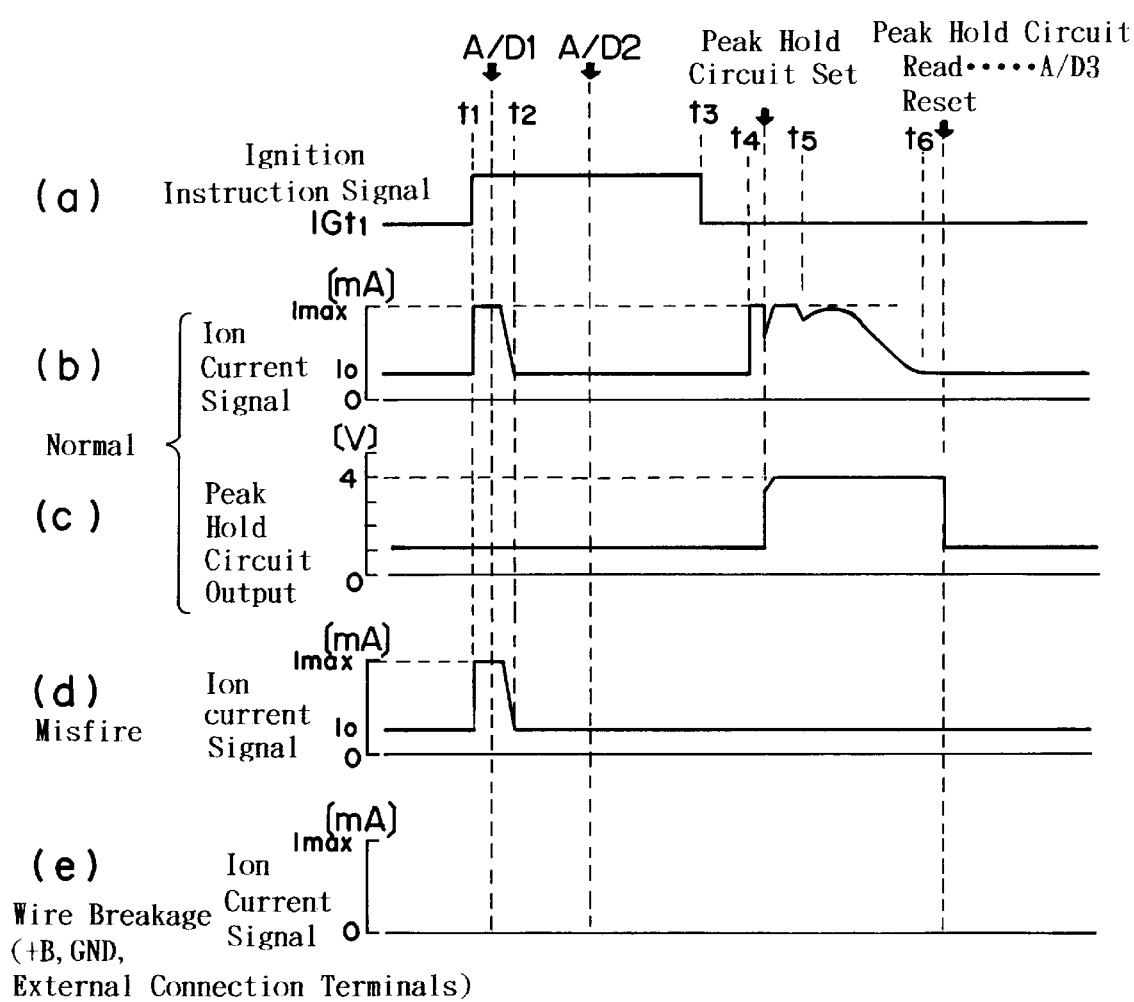
FIG. 2 is a timing chart indicating the transition of various output signals outputted in the apparatus of the embodiment.

FIG. 2 is a timing chart indicating the transition of various output signals in the combustion state detector apparatus of the embodiment.

The ignition instruction signal IGt1 outputted by the ECU 30 to the ignition coil/igniter unit 1 of the cylinder #1 is turned to an ON level at a time point t1 and to an OFF level at a time point t3, that is, an ignition timing (see the chart (a) in FIG. 2). The transition of output signals outputted when the combustion state is normal in the internal combustion engine will be described with reference to the charts (a), (b) and (c) of FIG. 2. When the combustion state in the internal combustion engine is normal, the current i flows through the external connection terminal 1b side of the ignition coil/igniter unit 1 of the cylinder #1 (hereinafter, the current i will sometimes be termed "ION current signal"), based on the current signal outputted from the operational amplifier 20 via the V/I converting circuit 22 and the offset current I0 outputted from the offset current source 23. The ion current signal, superimposed with the constant offset current I0 (mA), is superimposed with an ignition-on noise signal as indicated in the chart (b) in FIG. 2 (time t1–t2) immediately after a primary current I1 starts to flow through the primary winding 10a of the ignition coil 10 at the ON timing (time point t1) of the ignition instruction signal IGt1 indicated in the chart (a) of FIG. 2. During the time period t1–t2, the ion current signal becomes a maximum current Imax (mA). At the OFF timing (time point t3) of the ignition instruction signal IGt1, a secondary current I2 starts to flow through the secondary winding 10b of the ignition coil 10, and discontinues (at time point t4) after the ignition plug 12 has been energized for ignition. After the discontinuation of the secondary current I2, magnetism lingers in the core of the ignition coil 10. A lingering magnetism noise signal based on the effect of the lingering magnetism is superimposed on the ion current signal (time t4–t5). The ion current signal is further superimposed with an ion current signal based on actual ignition (time t5–t6). During the time period (t4–t6), the ion current signal becomes the maximum current Imax (mA).

Besides the ion current signal occurring while the combustion state of the internal combustion engine is normal, a peak hold circuit output processed through the noise mask circuit 32 and the peak hold circuit 33 in the ECU 30 is set at a timing which is 0.5 ms after ignition, that is, 0.5 ms after the time point t3 indicated in FIG. 2, and is reset at a timing which corresponds to 70 CA (crank angle) after the top dead center (AFTD), that is, which is slightly after the time point t6 at which the transition or change of the ion current signal comes to an end. A peak hold circuit output is read at the reset timing (see (c) of FIG. 2) in the peak hold circuit 33. The read peak hold circuit output is A/D-converted by the A/D converter 34. The thus-obtained value is set as A/D3 (indicated by an arrow in FIG. 2). Presetting is made such that the peak hold circuit output corresponding to the maximum current Imax (mA) of the ion current signal becomes 4 V and so that the peak hold circuit output corresponding to the offset current I0 (mA) becomes 1 V.

The transition of the output signals when a misfire occurs in combustion of the internal combustion engine will be described with reference to the charts (a) and (d) of FIG. 2. If a misfire occurs, the ion current signal (superimposed with the offset current I0 (mA)) is superposed only with an ignition-on noise signal as indicated in the chart (d) (time t1–t2) although the ignition instruction signal IGt1 outputted from the ECU 30 to the ignition coil/igniter unit 1 of the cylinder #1 of the internal combustion engine is turned to the ON and OFF levels as indicated in the chart (a). During the time period t1–t2, the ion current signal becomes the maximum current Imax (mA).

The transition of the output signals when a wire breaks will be described with reference to the charts (a) and (e) of FIG. 2. When a breakage occurs in the wire connecting to the +B terminal, the GND terminal or any other external connection terminals of the ignition coil/igniter unit 1 of the cylinder #1, the ion current signal remains at 0 mA without the offset current I0 (mA) or the ignition-on noise signal being superimposed (see the chart (e)) although the ignition instruction signal IGt1 outputted from the ECU 30 to the ignition coil/igniter unit 1 of the cylinder #1 of the internal combustion engine is turned to the ON and OFF levels as indicated in the chart (a).

The procedure of the diagnosis control executed by the CPU of the microcomputer 36 in the ECU 30 employed in the combustion state detector apparatus according to this embodiment of the invention will be described with reference to the flowchart of FIG. 3. FIGS. 2 and 4 will be also referred to in the following description. FIG. 4 shows a map indicating the relationship between the A/D converted values, A/D1 and A/D2, and the determination regions, wherein region A is a range of voltage that can be taken by A/D1 and A/D2 when the ignition coil/igniter units 1–4 of the cylinders #1–#4 are normal, and region B is a range of voltage that can be taken by A/D1 and A/D2 at the time of a failure of the detection system, a breakage of the wire connecting to the +B terminal, or the GND terminal or the external connection terminals for the ion current signal, or at the time of a circuit failure in the ignition coil/igniter units 1–4 of the cylinders #1–#4, and region D is a range of voltage that can be taken by A/D1 and A/D2 at the time of a failure in the input system, or at the time of a breakage of a wire connecting to the external connection terminal 1a to which the ignition instruction signal IGt1 is inputted, or at the time of a failure in the ECU 30, and range E is a range of voltage that can be taken by A/D1 and A/D2 at the time of a normal state or at the time of a misfire. The diagnosis control routine illustrated in FIG. 3 is repeatedly executed by the CPU every time the ECU 30 outputs the ignition instruction signals IGt1–IGt4 to the ignition coil/igniter units 1–4 of the cylinders #1–#4.

Figure 3:
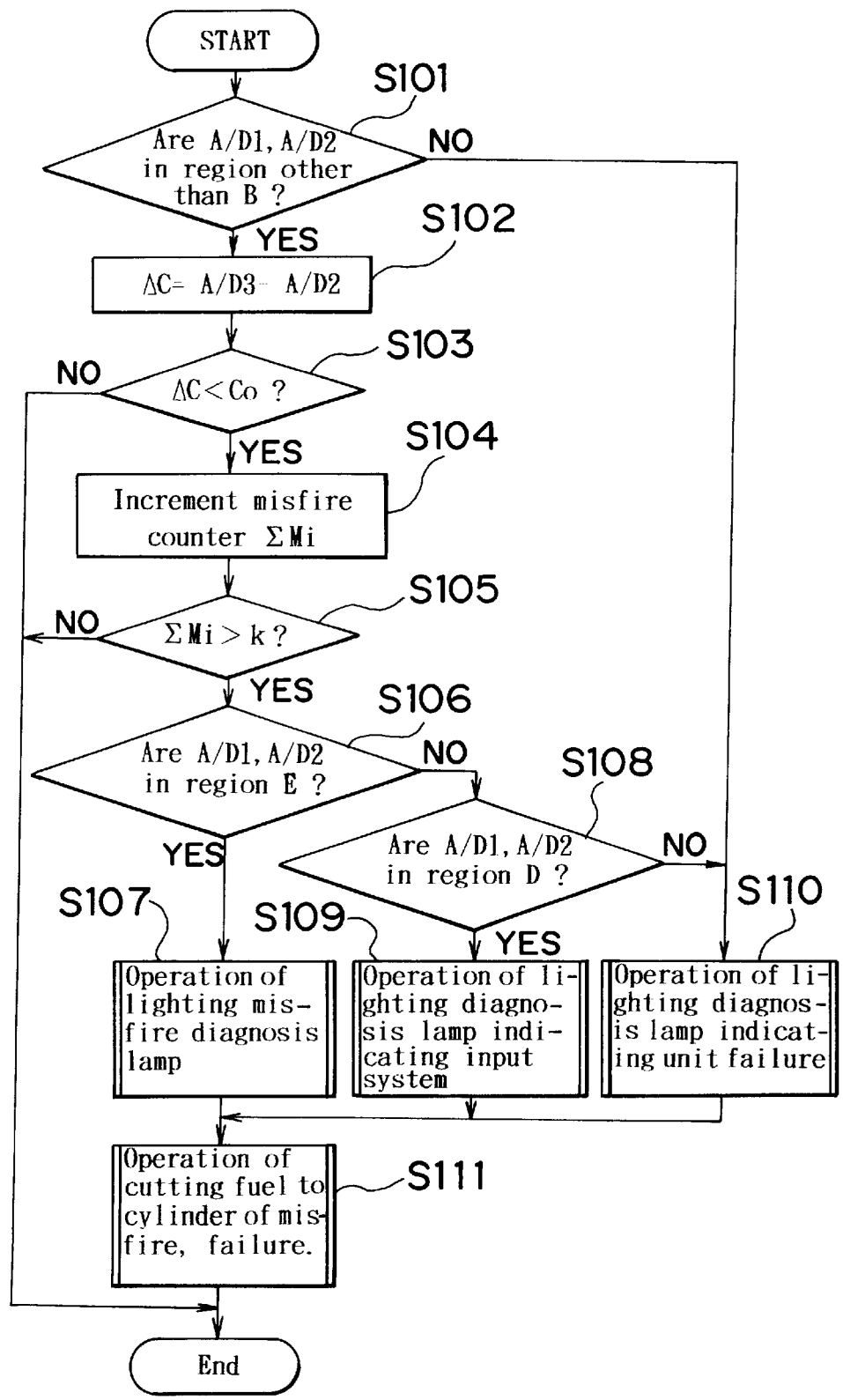
FIG. 3 is a flowchart illustrating the procedure of a diagnosis control performed by a microcomputer in an electronic control unit used in the embodiment.
Figure 4:
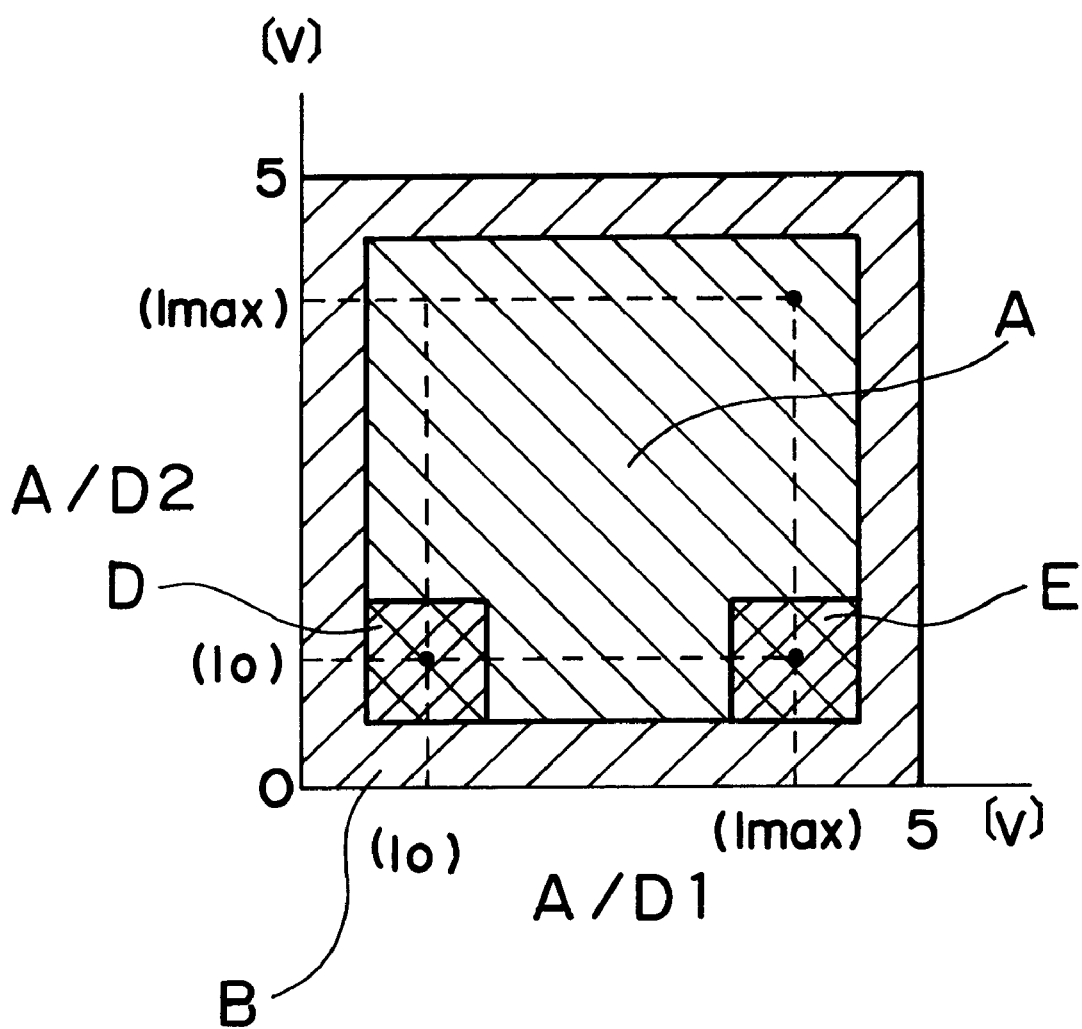
FIG. 4 is a map used in the control illustrated in FIG. 3, indicating the relationship between the A/D-converted values and the determination regions.

Referring to the flowchart of FIG. 3, in step S101, the CPU determines whether A/D1 and A/D2 are in a region other than the region B. A/D1 and A/D2 are A/D-converted values provided by the processing of the ion current signal by the LPF 35 and the A/D-conversion of the signal by the A/D converter 34. A/D1 is read at a timing which is 0.2 ms after the energization of the primary winding 10a of the ignition coil 10 is started by the turning of the ignition instruction signal IGt to the ON level, that is, 0.2 ms after the time point t1 indicated in FIG. 2. A/D2 is read at a timing which is 1.0 ms after the energization of the primary winding 10a of the ignition coil 10 is started by the turning of the ignition instruction signal IGt to the ON level, that is, 1.0 ms after the time point t1 indicated in FIG. 2. In FIG. 2, A/D1 and A/D2 are indicated by arrows. If the determination condition in step S101 are established, that is, if it is determined that A/D1 and A/D2 are within a region other than the range B, the operation proceeds to step S102, where the CPU calculates a magnitude C (mA) of the ion current signal by subtracting A/D2 from A/D3 (see FIG. 2).

Subsequently in step S103, the CPU determines whether the value C calculated in step S102 is less than a preset value C0, that is, whether a misfire has occurred. If a misfire has occurred, the ion current signal becomes equal to the offset current I0 (mA) between the set timing and the reset timing of the peak hold circuit 33 as indicated in the chart (d) of FIG. 2, that is, C is less than C0. The affirmative determination in step S103 is followed by step S104. In step S104, the CPU increments a misfire counter Mi in order to determine in the subsequent step whether a misfire has occurred a predetermined number of times. Subsequently in step S105, the CPU determines whether the count value of the misfire counter Mi is greater than a predetermined count value k. If the count value of the misfire counter Mi is greater than the predetermined count value k (YES in step S105), the operation proceeds to step S106, where the CPU determines whether A/D1 and A/D2 are in the region E in the map shown in FIG. 4, that is, a second predetermined region which is defined around a center point at which A/D1 is the voltage value corresponding to the maximum current Imax of the ion current signal and A/D2 is the voltage value corresponding to the offset current I0 of the ion current signal. If A/D1 and A/D2 are within the region E (YES in step S106), the operation proceeds to step S107. Since the affirmative determination in step S106 indicates that combustion has not occurred but a misfire has occurred, the CPU outputs, in step S107, a misfire diagnostic signal to promote a diagnosis, so that an operation of turning on a diagnostic lamp in the diagnostic apparatus (not shown) is performed.

Conversely, if A/D1 and A/D2 are not in the region E (NO in step S106), the operation proceeds to step S108, where the CPU determines whether A/D1 and A/D2 are in the region D, that is, a third predetermined region which is defined around a center point at which A/D1) and A/D2 are the voltage values corresponding to the offset current I0 of the ion current signal. If A/D1 and A/D2 are in the region D (YES in step S108), the operation proceeds to step S109. Since the affirmative determination in step S108 indicates that a failure has occurred in the input system, the CPU outputs, in step S109, an input system failure diagnostic signal, so that an operation of lighting a diagnostic lamp in the diagnostic apparatus (not shown) is performed.

If it is determined in step S101 that A/D1 and A/D2 are in the region B (NO in step S101), or if it is determined in step S108 that A/D1 and A/D2 are not in the region D (NO in step S108), that is, if the determinations in step S103 and step S105 are affirmative and A/D1 and A/D2 are in the region A, that is, a fourth predetermined region that is other than the regions E and D, then the operation proceeds to step S110. Since the result of determination made before step S110 indicates that an output characteristic abnormality, including a wire breakage and the like, has occurred in at least one of the ignition coil/igniter units 1–4 of the cylinders #1–#4, the CPU outputs, in step S110, a unit failure diagnostic signal, so that an operation of lighting a diagnostic lamp in the diagnostic apparatus (not shown) is performed. The operation in step S107, S109 or S110 is followed by step S111, where the CPU performs an operation of cutting fuel to the cylinder that is experiencing a misfire or a failure. This routine is then ended. If it is determined in step S103 that C is equal to or greater than CO (NO in step S103), or if it is determined in step S105 that the count value of the misfire counter Mi is equal to or less than the predetermined count value k (NO in step S105), it is regarded that the ignition state is normal as indicated in the chart (b) of FIG. 2, and then the routine is ended.

As is apparent from the foregoing description, the combustion state detector apparatus according to this embodiment includes a current detector device formed by the capacitor 15, the ion current detecting resistor 17, the operational amplifier 20 and the like for detecting a current that flows between the ground and the ignition plug 12 disposed in a combustion chamber of the internal combustion engine, a signal converter device formed by the V/I converting circuit 22 for converting the current detected by the current detector device into an ion current signal that can be processed by the ECU 30, and an ignition driving device formed by the switching element 11 and the like for driving the ignition coil 10 on the basis of the ignition instruction signal IGt from the ECU 30. The current detector device, including the signal converter device, and the ignition driving device, including the ignition coil 10, are integrated into units separately for the individual cylinders #1–#4 of the internal combustion engine so that the integrated units are independent of one another.

Therefore, the ignition driving device formed by the switching element 11 and the like drives the ignition coil 10 on the basis of the ignition instruction signal IGt from the ECU 30, and the current detector device formed by the capacitor 15, the ion current detecting resistor 17, the operational amplifier 20 and the like detects a current that flows between the ignition plug 12 and the ground. The signal converter device formed by the V/I converting circuit 22 converts the detected current into an ion current signal that is to be inputted to the ECU 30. The current detector device, the signal converter device, and the ignition driving device including the ignition coil 10 are integrated into units corresponding on a one-to-one basis to the individual cylinders #1–#4 of the internal combustion engine. The units for the cylinders #1–#4 are independent of each other. With this construction, signals are transmitted and received between the ECU 30 and the units separately for each of the cylinders #1–#4, so that it is easy to identify a cylinder that is experiencing a misfire or a failure. Consequently, this embodiment makes it possible to design a system wherein a failure can easily be determined separately for each cylinder and wherein component parts or the like of the unit for a cylinder with a failure can be replaced without disturbing the units for normal cylinders. In the combustion state detector apparatus for an internal combustion engine according to this embodiment, the signal converter device formed by the V/I converting circuit 22 includes the offset current source 23, that is, an output offset circuit for causing the outputs to the ECU 30 to be within a predetermined range. The ECU 30 monitors the ion current signal outputted from the signal converter device, and performs a failure diagnosis regarding a failure in a signal-conducting wire, separately from a misfire diagnosis, and then outputs a diagnostic signal separately for each of the cylinders #1–#4 of the internal combustion engine. That is, since the signal converter device, including the offset current source 23 and the V/I converting circuit 22, causes the magnitude of the output to the ECU 30 to be within a predetermined range if the signal converter device is normal, the ECU 30 can perform the failure diagnosis regarding a failure in the signal-conducting wires or the signal converter device, separately from the misfire diagnosis, by monitoring the ion current signal from the signal converter device and determining whether magnitude of the ion current signal is within the predetermined range or not. Therefore, the ECU 30 is able to output a failure diagnostic signal regarding the signal-conducting wires or the signal converter device, separately from a misfire diagnostic signal, for each of the cylinders #1–#4 of the internal combustion engine. Consequently, it becomes possible to identify a cylinder that is experiencing a failure and identify a failure factor.

In the combustion state detector apparatus according to this embodiment, the ECU 30 performs a diagnostic determination separately for each cylinder as follows. If a change in the ion current signal from the signal converter device formed by the V/I converting circuit 22 and the like is in the first predetermined range, the ECU 30 determines that a misfire has occurred when the output signal change is in the second predetermined range, and determines that an output signal input abnormality has occurred when the output signal change is in the third predetermined range, and determines that a failure in the unit has occurred when the output signal change is in the fourth predetermined range. In short, the combustion state detector apparatus of this embodiment performs a determination regarding the occurrence of a misfire, a failure in the input system, and a failure in the unit, separately for each cylinder, thereby making it possible to identify a failure factor and the cylinder experiencing a failure. The combustion state detector apparatus outputs a diagnostic signal in accordance with the result of this determination.

According to this embodiment, if it is determined that a misfire has occurred in a cylinder of the internal combustion engine or a unit failure has occurred in a unit formed by the current detector device, the signal converter device and the ignition driving device, the combustion state detector apparatus stops the fuel supply to the cylinder experiencing the misfire or the unit failure. More specifically, since the ECU 30 sends signals to and receives signals from the units separately for the individual cylinders, it is possible to identify a cylinder that is experiencing a misfire or a unit failure and to stop the fuel supply to that cylinder. Consequently, it becomes possible to prevent an inflow of unburned gas to a catalytic device provided in an exhaust passage of the internal combustion engine, and therefore prevent overheating of the catalytic device, whereby the catalytic device can be protected and the emission degradation can be prevented.

While the present invention has been described with reference to what is presently considered to be a preferred embodiment thereof, it is to be understood that the invention is not limited to the disclosed embodiment or constructions. To the contrary, the invention is intended to cover various modifications and equivalent arrangements included within the spirit and scope of the invention.

What is claimed is:

1. A combustion state detector apparatus for an internal combustion engine, the engine including a plurality of combustion chambers, comprising:

a central control unit; and a plurality of independent satellite control units, wherein each of the satellite control units corresponds to a respective one of the combustion chambers and is coupled to the central control unit, each satellite control unit including:

an ignition plug disposed in the respective one of the combustion chambers;

a current detection means for detecting a current flowing between the respective ignition plug and a ground and transmitting signals to the central control unit; and ignition driving means for driving the respective ignition plug;

wherein the central control unit detects a combustion state of the engine on the basis of the current detection signals received from the satellite control units and outputs ignition instruction signals to the ignition driving means of each of the satellite control units to control the driving of the ignition plugs.

2. A combustion state detector apparatus according to claim 1, wherein each of the current detection means detects a voltage signal corresponding to an ion current occurring when the respective ignition plug is driven on the basis of the corresponding ignition instruction signal received from the central control means.

3. A combustion state detector apparatus according to claim 2, wherein each of the current detection means includes signal conversion means for converting into a current signal the detected voltage signal corresponding to the ion current.

4. A combustion state detector apparatus according to claim 3, wherein each of the signal conversion means includes output offset means for adjusting an output from the signal conversion means to the central control means to be within a predetermined range, and wherein the central control means monitors signals output from each of the signal conversion means and determines whether the output signals are within a first predetermined range.

5. A combustion state detector apparatus according to claim 4, wherein the central control means determines whether a first value of the output signal at a first time and a second value of the output signal at a second time after the first time from a respective one of the satellite control means are within second predetermined range, respectively and wherein, when the first and second values are both within the respective second range and a difference between a third value of the output signal at a third time after the second time and the second value is less than a predetermined amount, the central control means determines that a misfire has occurred when the first value and the second value are within a third predetermined range and, when the first and second values are both within the respective second range and the difference between the third value and the second value is less than the predetermined amount, the central control means determines that a malfunction other than a misfire has occurred when the first value and the second value are within a fourth predetermined range.

6. A combustion state detector apparatus according to claim 5, wherein the central control means outputs a diagnostic signal in accordance with a result of the determination made by the central control means.

7. A combustion state detector apparatus according to claim 5, wherein when the central control means determines that one of a misfire and a unit failure has occurred, the central control means stops fuel supply to the respective one of the combustion chambers in which the misfire or unit failure has been detected.

* * * * *